United States Patent
Yasue et al.

[11] Patent Number: 5,816,977
[45] Date of Patent: Oct. 6, 1998

[54] OIL PRESSURE CONTROL SYSTEM HAVING AN ON/OFF SOLENOID AND A LOWERED ELECTRICAL RESISTANCE PWM SOLENOID FOR CONTROLLING A PRESSURE REGULATOR

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 862,381

[22] Filed: May 23, 1997

[30] Foreign Application Priority Data

May 27, 1996 [JP] Japan .................................. 8-154889

[51] Int. Cl.$^6$ .................................................. F16M 61/00
[52] U.S. Cl. ........................ 477/138; 477/121; 477/131; 251/129.08
[58] Field of Search ..................................... 477/127, 130, 477/131, 138; 251/129.08; 361/166, 167

[56] References Cited

U.S. PATENT DOCUMENTS 5,514,047  5/1996  Tibbles et al. ............................. 477/46
5,621,604  4/1997  Carlson ............................... 361/166 X

FOREIGN PATENT DOCUMENTS 4-362359  12/1992  Japan .

*Primary Examiner*—Khoi Q. Ta
*Attorney, Agent, or Firm*—Oblon, Spivak, McClelland, Maier & Neustadt, P.C.

[57] ABSTRACT

An oil pressure control system for an automatic transmission for controlling the oil pressure of a frictional engagement element by a regulator valve for outputting an oil pressure according to a signal pressure inputted. The oil pressure control system comprises: a first solenoid valve for outputting a signal pressure varying with an electric signal; and a second solenoid valve having a coil of a higher resistance than that of the first solenoid valve and for applying, when activated, a signal pressure in the same direction as the signal pressure of the first solenoid valve to the regulator valve. As a result, it is possible to accurately control the oil pressure at the transient time of a speed change of the frictional engagement element of the automatic transmission and to prevent the controlling solenoid valves from being damaged.

4 Claims, 6 Drawing Sheets

FIG.7

| SHIFT | GEAR STAGE | C1 | C2 | C3 | B1 | B2 | B3 | F1 | F2 |
|---|---|---|---|---|---|---|---|---|---|
| P | | | | | | | ○ | | |
| R | | | ○ | | | ○ | ○ | | |
| N | | | | | | | ○ | | |
| D | 1ST | ○ | | | | | ○ | △ | △ |
| D | 2ND | ○ | | | ○ | | ○ | | △ |
| D | 3RD | ○ | ○ | | | | ○ | | △ |
| D | 4TH | ○ | ○ | ○ | | | | | |
| 2 | 1ST | ○ | | | | | ○ | △ | △ |
| 2 | 2ND | ○ | | | ○ | | ○ | | △ |
| L | 1ST | ○ | | | | ○ | ○ | △ | △ |

(△ : ACTIVE ONLY AT DRIVE)

OIL PRESSURE CONTROL SYSTEM HAVING AN ON/OFF SOLENOID AND A LOWERED ELECTRICAL RESISTANCE PWM SOLENOID FOR CONTROLLING A PRESSURE REGULATOR

BACKGROUND OF THE INVENTION

1. Field of the Invention

The present invention relates to an oil pressure control system for controlling the oil pressure of frictional engagement elements such as clutches or brakes in an automatic transmission.

2. Related Art

An automatic transmission for ordinary vehicles is constructed to achieve a predetermined gear stage by actuating frictional engagement elements including clutches and/or brakes with oil pressure. The apply/release of the oil pressure to the frictional engagement element is controlled by controlling a change- over valve with a solenoid valve or by controlling the oil pressure of the frictional engagement element directly with the solenoid valve. One example is disclosed in JPA-4-362359, which is directed to a system for applying the frictional engagement element by the output pressure of the solenoid valve. To the frictional engagement element, there is connected on shuttle valve, to which are connected two solenoid valves. When one solenoid valve fails, the other solenoid valve applies and releases the oil pressure to and from the frictional engagement element. Specifically, the two solenoid valves are connected to one frictional engagement element so that they may back up each other.

Incidentally, the frictional engagement element of the automatic transmission has to be controlled not only into the applied and released states for achieving a predetermined gear stage but also into the so- called "slip state" where the torque capacity is gradually varied at a transient time of speed change. In the prior art, this slip state at the transient time is widely controlled by an accumulator. In recent years, however, the slip state is controlled by using a duty solenoid valve for varying the output pressure continuously.

The solenoid valve of this kind for varying the output pressure continuously is required to have a high responsibility to an electric input signal because it is electrically controlled to vary the output pressure. For this requirement, the solenoid valve, as used, is equipped with a coil having a low resistance. On the other hand, the frictional engagement element has to be kept in the applied state, as described above. If this applied state is held by activating the solenoid valve, the electric current is fed to the coil for a long time. When the solenoid valve used has a coil of low resistance, it may probably be damaged as a result that the high current flows through the coil for the long time.

When the two solenoid valves are used for one frictional engagement element and backed up by each other, as disclosed in the above-specified publication, the damage of one solenoid valve would not lead directly to the case where the frictional engagement element cannot be controlled. However, it is still impossible to prevent the trouble that the damage of the solenoid valve will occur early.

In order to suppress the current to flow the coil, moreover, it is possible to use a dropping resistor or to chop the supply voltage. With this improvement, the number of parts or control softwares increases to raise the cost undesirably for the entire control system.

SUMMARY OF THE INVENTION

A main object of the present invention is to provide an oil pressure control system for an automatic transmission, which is excellent in responsibility without any damage of a solenoid valve.

According to the present invention, therefore, there is provided an oil pressure control system for an automatic transmission for controlling the oil pressure of a frictional engagement element by a regulator valve for outputting an oil pressure according to a signal pressure inputted. The oil pressure control system comprises: a first solenoid valve for outputting a signal pressure varying with an electric signal; and a second solenoid valve having a coil of a higher resistance than that of the first solenoid valve and for applying, when activated, a signal pressure in the same direction as the signal pressure of the first solenoid valve to the regulator valve.

According to the present invention, therefore, the first solenoid valve outputs the signal pressure according to the electric signal by varying the duty ratio, and the regulator valve controls the oil pressure of the frictional engagement element in accordance with the signal pressure. On the other hand, the second solenoid valve outputs, when activated, the signal pressure to act upon the regulator valve in the same direction as the signal pressure of the first solenoid valve. As a result, the regulator comes into an active state as if it were fed with the signal pressure from the first solenoid valve, by activating the second solenoid valve, so that the first solenoid valve can be inactivated. Since this second solenoid valve has a higher resistance than that of the first solenoid valve, moreover, it will not be especially troubled even if it is continuously activated to output the signal pressure. Since the first solenoid valve is given the low resistance, on the other hand, its responsibility can be improved by changing the signal pressure continuously to vary the pressure regulating level of the regulator valve.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a clutch/brake application chart showing the applied/released states of frictional engagement elements, as corresponding the shift positions and the individual gear stages of an automatic transmission of FIG. 6.

DESCRIPTION OF THE PREFERRED EMBODIMENTS

Figure 6:
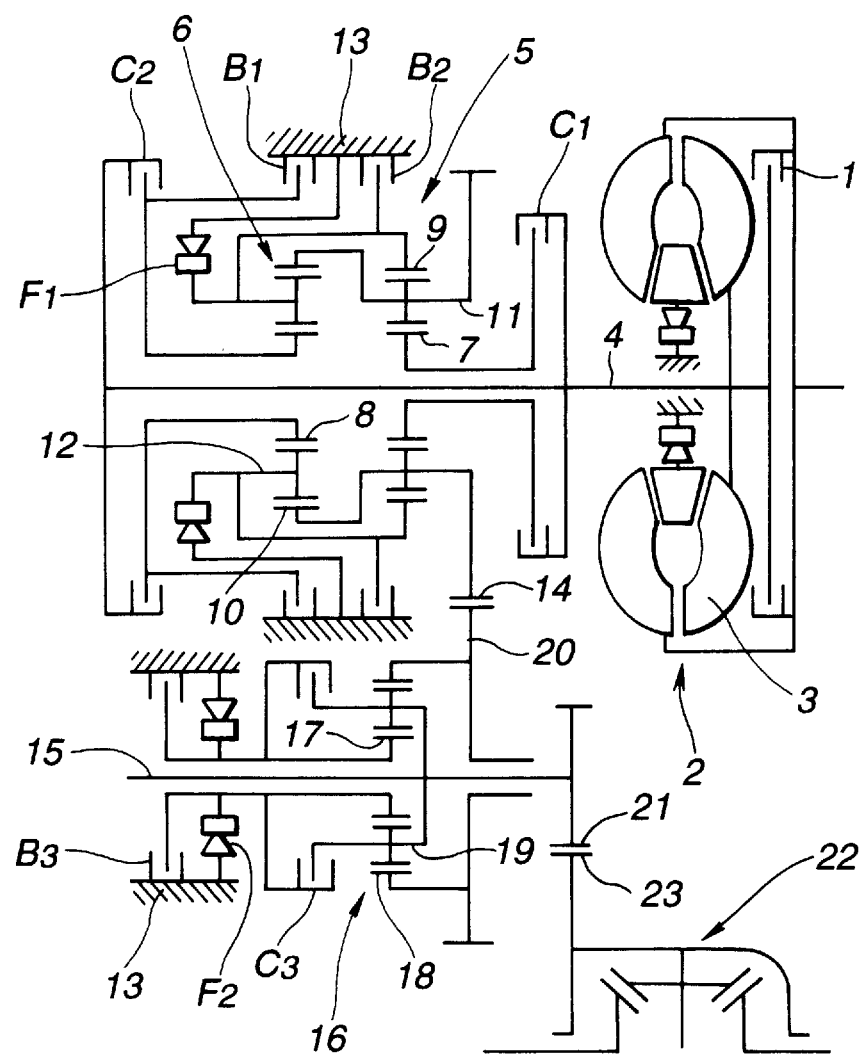
FIG. 6 is a schematic diagram showing a gear train in the embodiment of the present invention.

The present invention will be specifically described with reference to the accompanying drawings. Here will be described one example of the gear train of an automatic transmission the present invention relates to. To a turbine runner 3 of a torque converter 2 equipped with a lockup clutch 1, as shown in FIG. 6, there is connected an input shaft 4. In alignment with this input shaft 4, there are arrayed a first planetary gear mechanism 5 and a second planetary gear mechanism 6. These planetary gear mechanisms 5 and 6 are of the single pinion type, as individually constructed to have three components: sun gears 7 and 8; ring gears 9 and 10 or internal gears arranged concentrically of the sun gears 7 and 8; and carriers 11 and 12 retaining pinions meshing with those sun gears 7 and 8 and ring gears 9 and 10.

Of these planetary gear mechanisms 5 and 6, the carrier 11 of the first one 5, as located at the righthand side of FIG. 6, and the ring gear 10 of the left one 6 are so connected as to rotate together, and the ring gear 9 of the first one 5 and the carrier 12 of the second one 6 are so connected as to rotate together. As a result of these connections of the carriers 11 and 12 and the ring gears 9 and 10, therefore, those first and second planetary gear mechanisms 5 and 6 are constructed to have totally four rotary elements: the integrated carrier 11 and ring gear 10, the integrated carrier 12 and ring gear 9, and the two sun gears 7 and 8.

Of these rotary elements, the sun gear 7 of the first planetary gear mechanism 5 is selectively connected to the input shaft 4 by a multi-disc clutch (as will be tentatively called the "first clutch") C1. There is further provided a multi-disc clutch (as will be tentatively called the "second clutch") C2 for connecting the sun gear 8 of the second planetary gear mechanism 6 selectively to the input shaft 4.

Between the sun gear 8 of the second planetary gear mechanism 6 and a casing 13, there is interposed as brake means a multi-disc brake (as will be tentatively called the "first brake") B1 for stopping the rotation of the sun gear 8 selectively. Between the ring gear 9 of the first planetary gear mechanism 5 and the carrier 12 of the second planetary gear mechanism 6, as integrated with each other, and the casing 13, moreover, there is interposed a multi-disc brake (as will be tentatively called the "second brake") B2 for stopping the rotations of the ring gear 9 and the carrier 12 selectively. In parallel with this second brake B2, there is arranged a one-way clutch F1.

To another rotary element, i.e., the carrier 11 of the first planetary gear mechanism 5 and the ring gear 10 of the second planetary gear mechanism 6, as integrated with each other, there is attached a counter drive gear 14.

Here will be described the array of the aforementioned components. The first planetary gear mechanism 5 and the second planetary gear mechanism 6 are arranged adjacent to each other. The first clutch C1 is arranged between the first planetary gear mechanism 5 and the torque converter 2, and the counter drive gear 14 is arranged between the first clutch C1 and the first planetary gear mechanism 5. On the other hand, the second clutch C2 is arranged at the opposite side of the first clutch C1 across the individual planetary gear mechanisms 5 and 6. The one-way clutch F1 is arranged between the second clutch C2 and the second planetary gear mechanism 6.

In parallel with the aforementioned input shaft 4, i.e., the center axis of the individual planetary gear mechanisms 5 and 6, there is arranged a counter shaft 15. In alignment with this counter shaft 15, there is arranged a third planetary gear mechanism 16. This third planetary gear mechanism 16 is also the single pinion type, as constructed to have three components: a sun gear 17; a ring gear 18 or an internal gear arranged concentrically of the sun gear 17, and a carrier 18 retaining a pinion meshing with those sun gear 17 and ring gear 18.

Adjacent to the third planetary gear mechanism 16, there is arranged a counter driven gear 20 such that it is rotatable with respect to and in alignment with the counter shaft 15. The counter driven gear 20 is in meshing engagement with the counter drive gear 14. Moreover, the ring gear 18 of the third planetary gear mechanism 16 is so connected as to rotate together with the counter drive gear 20, and the carrier 19 is so connected as to rotate together with the counter shaft 15.

Between the sun gear 17 and the carrier 19 of the three components of the third planetary gear mechanism 16, there is interposed a multi-disc clutch (as will be tentatively called the "third clutch") C3 for connecting the sun gear 17 and the carrier 19 selectively. Between the sun gear 17 and the casing 13, moreover, there is arranged a multi-disc brake (as will be called the "third brake") B3 for stopping the rotation of the sun gear 17 selectively. Between the sun gear 17 and the casing 13, there is further arranged a one-way clutch F2 which is juxtaposed to the third brake B3.

To the righthand end portion, as seen in FIG. 6, of the counter shaft 15, that is, to the end portion at the side of the torque converter 2, there is attached an output gear 21 which is in meshing engagement with a ring gear 23 in a differential 22.

The automatic transmission having the gear train thus far described can set four forward and one reverse gear stages by applying/releasing the aforementioned individual frictional engagement elements in accordance with the application chart of FIG. 7. In FIG. 7: symbols ○ indicate the applied state; blanks indicate the released state; and symbols Δ indicate the applied state to be taken at the drive time. Moreover: letter P designates a parking range; letter N designates a neutral range; letter R designates a reverse range; letter D designates a drive range; numeral "2" designates a "2" range or an engine braking range for an upshift up to a second speed; and letter L designates a low range for setting a first speed for effecting the engine braking. These individual ranges are selected by a not-shown shift unit.

Figure 1:
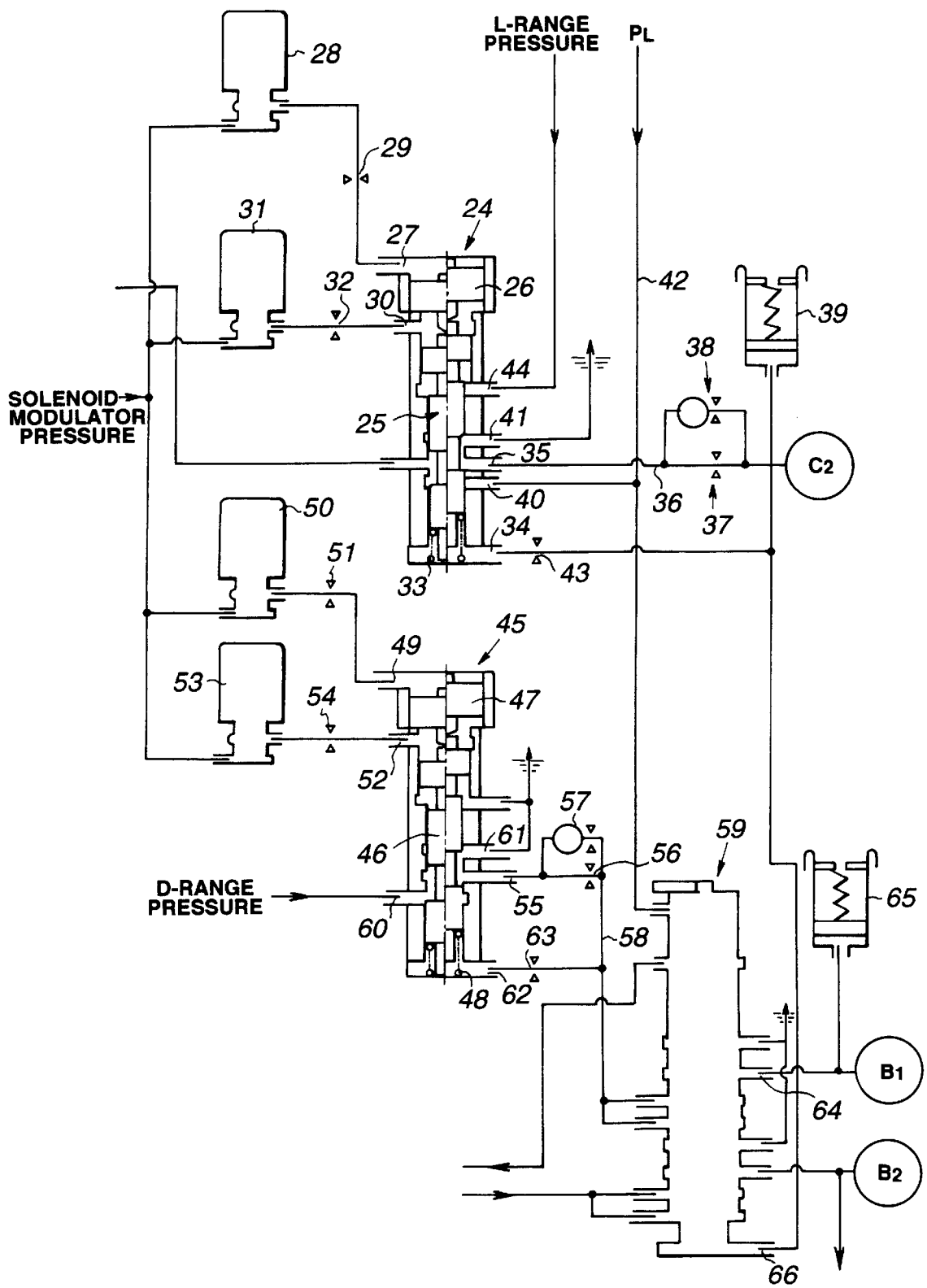
FIG. 1 is a hydraulic circuit diagram showing a portion of one example of a hydraulic circuit according to the present invention.

The aforementioned automatic transmission is constructed to control the oil pressures of at least the second clutch C2 and the first brake B1 directly by a solenoid valve, and one example of its hydraulic circuit is shown in FIG. 1.

In FIG. 1, reference numeral 24 designates a C2 oil pressure control valve acting as a regulator valve for controlling the oil pressure of the second clutch C2. This C2 oil pressure control valve 24 is equipped with a spool 25 having three lands, and a plunger 26 is arranged at one end side of the spool 25. The land of the spool 25 at the side of the plunger 26 is given a larger external diameter than those of the remaining lands, and the plunger 26 is given a larger diameter than that of the diametrically larger land of the spool 25.

In the end portion (as located at the upper end portion of FIG. 1) of the plunger 26, there is opened a lock port 27, to which is connected a first solenoid valve 28 via an orifice 29. Between the plunger 26 and the spool 25, on the other hand, there is formed a control port 30, to which is connected a second solenoid valve 31 via an orifice 32.

These solenoid valves 28 and 31 are electromagnetic valves using a solenoid modulator pressure as their initial pressure. The first solenoid valve 28 is an ON/OFF valve for outputting a signal pressure when activated. On the other hand, the second solenoid valve 31 is an electromagnetic valve which is subjected to a duty control for outputting a signal pressure, which takes the highest level when the second solenoid valve 31 is ON, i.e., at the duty ratio of 100%. Moreover, the second solenoid valve 31 is employed by an electromagnetic valve which is equipped with a coil having a low electric resistance so as to enhance the responsibility of the output pressure to an electric signal (or duty signal), whereas the first solenoid valve 28 is exemplified by an electromagnetic valve which is equipped with a coil having a higher resistance than that of the second solenoid valve 31 so as to decrease the electric current.

At the opposite side of the plunger 26 across the spool 25, that is, at the lower end portion of FIG. 1, there is arranged a spring 33 for urging the spool 25 in the axial direction, and there is formed a feedback port 34 which is opened in a portion where the spring 33 is arranged. In an axially intermediate portion of the C2 oil pressure control valve 24, on the other hand, there is formed an output port 35 which is always open irrespective of the position of the spool 25 and with which is connected the second clutch C2 via an oil passage 36. Incidentally, this oil passage 36 is equipped therein with an orifice 37 and an orifice 38 having a check ball, which are arranged in parallel with each other. With the oil passage 36 at the side of the second clutch C2, there is connected via those orifices 37 and 38 a damper 39. This damper 39 is equipped with a spring-urged piston to absorb the oil pressure as the piston retracts while compressing the spring, and acts to level the oil pressure to be fed to the second clutch C2.

At the two sides across the output port 35, there are formed an input port 40 and a drain port 41. At the lower side of FIG. 1 than the output port 35, more specifically, there is formed the input port 40 which is opened/closed by the lower land of the spool 25 to communicate selectively with the output port 35. With this input port 40, there is connected a line pressure oil passage 42 which is supplied with an initial pressure of the entire hydraulic control system, i.e., a line pressure PL, as regulated according to the throttle opening.

In order that the oil pressure of the second clutch C2 may act upon the spool 25, moreover, the feedback port 34 is connected via an orifice 43 with the second clutch C2. Incidentally, reference numeral 44 appearing in FIG. 1 designates an L-range port to which is applied an L-range pressure to be outputted from the (not-shown) manual valve when the L-range is selected.

In the C2 oil pressure control valve 24 thus far described, therefore, the output pressure or the oil pressure of the second clutch C2 is applied to the feedback port 34 so that the output pressure is regulated to balance the loads to act in the axial direction across the spool 25. Moreover, the load to push the spool 25 downward of FIG. 1 increases according to the signal pressure to be fed to the control port 30 by the second solenoid valve 31, that is to say, the regulated level changes with the signal pressure of the second solenoid valve 31 so that the oil pressure to be fed to the second clutch C2 rises according to the signal pressure to be outputted from the second solenoid valve 31. The signal pressure of this second solenoid valve 31 takes its maximum when the duty ratio is at or near 100%, and the line pressure is then fed as it is to the second clutch C2. When the first solenoid valve 28 is activated to apply its signal pressure to the lock port 27, the spool 25 is left pushed downward of FIG. 1 because of the large pressure receiving area of the plunger 26.

This is similar to the state in which the second solenoid valve 31 is ON, and the completely applied state of the second clutch C2 is set when not the second solenoid valve 31 but the first solenoid valve 28 outputs the signal pressure. Because of a high resistance, moreover, the first solenoid valve 28 is not damaged even while it is activated for a long time to keep the second clutch C2 in the applied state.

Here will be described the construction for controlling the oil pressure of the first brake B1. A brake pressure control valve 45 acting as a regulator valve for regulating the oil pressure of the first brake B1 is give, as shown in FIG. 1, a construction substantially similar to that of the aforementioned C2 oil pressure control valve 24. Across a spool 46 having three lands, of which the upper land is given a larger diameter, there are arranged a plunger 47 having a larger diameter than that of the diametrically larger land and a spring 48. With a lock port 49 opened at the side of the plunger 48, there is connected via an orifice 51 a third solenoid valve 50 which is equipped with a coil having a high resistance. Between a control port 52 opened between the plunger 47 and the spool 46, moreover, there is connected via an orifice 54 a fourth solenoid valve 53 which is equipped with a coil having a low resistance. Incidentally, these third and fourth solenoid valves 50 and 53 are electromagnetic valves using the solenoid modulator pressure as their initial pressures, and the third solenoid valve 50 is subjected to the ON/OFF control whereas the fourth solenoid valve 53 is subjected to the duty control.

In an axially intermediate portion of this brake pressure control valve 45, there is formed an output port 55 which is always open irrespective of the position of the spool 46. The first brake B1 is connected with the output port 55 via an oil passage 58, which is provided with an orifice 56 and an orifice 57 having a check ball, as arranged in parallel with each other, and through a fail-safe valve 59.

At the two sides across this output port 55, there are formed an input port 60 and a drain port 61. Below the output 55, as seen in FIG. 1, there is formed the input port 60 which is opened/closed by the lower land of the spool 46 to communicate selectively with the output port 55. This input port 60 is fed with a D-range pressure to be outputted from the manual valve at each of the D-range, the "2" range and the L-range. There is further formed a feedback port 62 which is opened in the portion where the spring 48 is arranged and with which is connected the aforementioned oil passage 58 via an orifice 63.

On the other hand, the first brake B1 is connected together with a damper 65 with a first brake port 64 of the fail-safe valve 59. Incidentally, this fail-safe valve 59 is one for preventing the first brake B1 or the second brake B2 from being fed with the oil pressure while the second clutch C2 is being applied, and is fed at its control port 66 with the oil pressure of the second clutch C2. As a result, the second brake B2 is also fed with the oil pressure through that fail-safe valve 59.

In the brake pressure control valve 45 thus far described, therefore, the output pressure or the oil pressure of the first brake B1 acts upon the feedback port 62 so that the output pressure is regulated to balance the loads to act in the axial direction across the spool 46. Moreover, the load to push the spool 46 downward of FIG. 1 increases according to the signal pressure to be fed to the control port 52 by the fourth solenoid valve 53, that is to say, the regulated pressure level changes with the signal pressure of the fourth solenoid valve 53 so that the oil pressure to be fed to the first brake B1 rises according to the signal pressure to be outputted from the fourth solenoid valve 53. The signal pressure of this fourth solenoid valve 53 takes its maximum when the duty ratio is at or near 100%, and the line pressure PL is then fed as it is to the first brake B1. When the third solenoid valve 50 is activated to apply its signal pressure to the lock port 49, the spool 46 is left pushed downward of FIG. 1 because of the large pressure receiving area of the plunger 47.

This is similar to the state in which the fourth solenoid valve 53 is ON, and the completely applied state of the first brake B1 is set when not the fourth solenoid valve 53 but the third solenoid valve 50 outputs the signal pressure. Because of a high resistance, moreover, the third solenoid valve 50 is not damaged even while it is activated for a long time to keep the first brake B1 in the applied state.

Incidentally, the aforementioned individual solenoid valves 28, 31, 50 and 53 are electrically connected with a not-shown electronic control unit so that they are suitably subjected to the ON/OFF control or the duty control on the basis of the running state of the vehicle.

Figure 2:
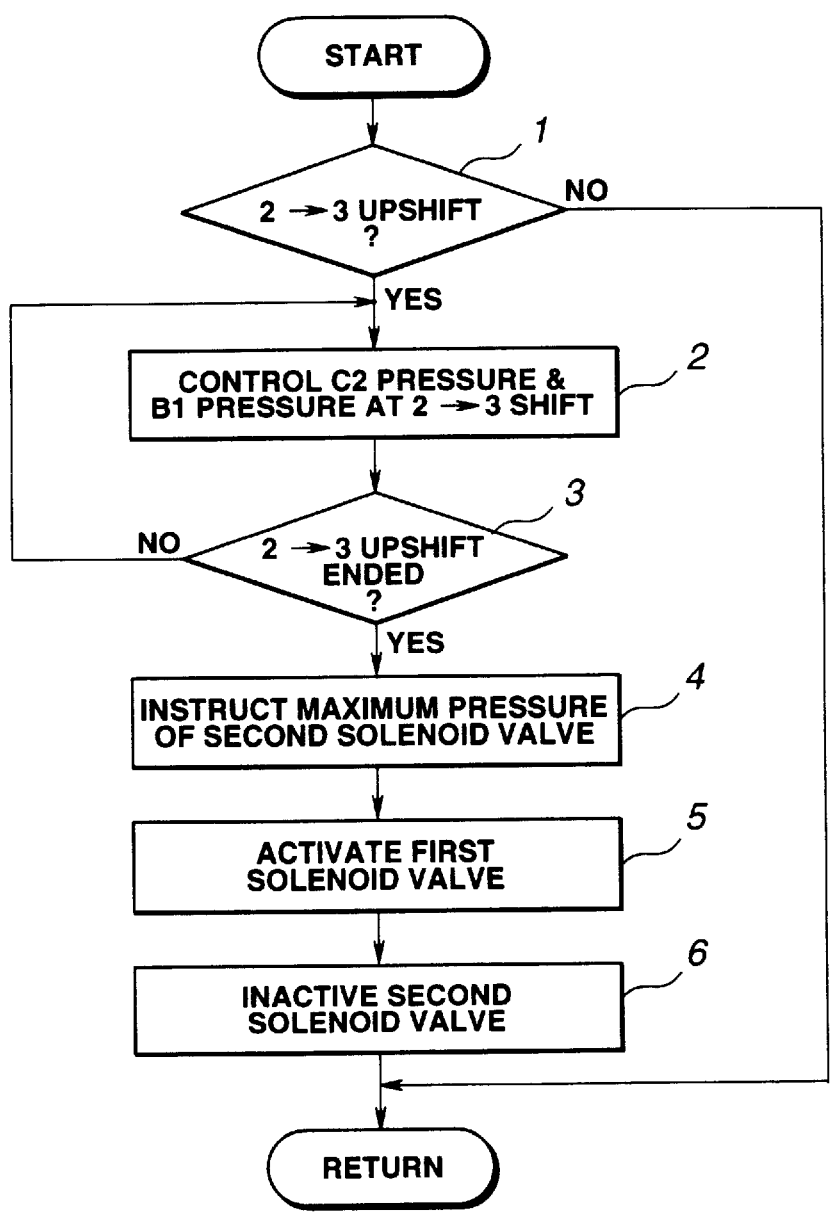
FIG. 2 is a flow chart showing one example of a control routine of a hydraulic control system in an embodiment of the present invention.

Next, a control example for an upshift from the second speed to the third speed in the automatic transmission, as shown in FIG. 6, will be described with reference to the flow chart of FIG. 2. At the second speed in the drive state, the individual frictional engagement elements are in the state where the first clutch C1, the first brake B1, the third brake B3 and the one-way clutch F2 are individually applied, as shown in FIG. 7. At the third speed in the drive state, on the other hand, the first clutch Cl, the second clutch C2, the third brake B3 and the one-way clutch F2 are individually applied. Therefore, the speed changes between the second speed and the third speed are the clutch-to-clutch ones in which the applied/released states of the second clutch C2 and the first brake B1 are interchanged.

When the second speed is set, the first solenoid valve 28 and the second solenoid valve 31 are controlled in inactive states. In other words, the signal pressure is not fed to the lock port 27 and the control port 30. As a result, the spool 25 of the C2 oil pressure control valve 24 is held in the position, as indicated at the righthand half of FIG. 7, so that the input port 37, as connected with the line pressure oil passage 42, is shut by the spool 25. Since the output port 35 and the drain port 38 communicate with each other, on the other hand, the second clutch C2 is drained and held in the released state.

On the other hand, the third solenoid valve 50 is activated to produce its signal pressure as the solenoid modulator pressure. As a result, the output pressure (i.e., the oil pressure to be fed to the first brake B1) of the brake pressure control valve 45 takes a level as high as the D-range pressure. In short, the first brake B1 is completely applied.

During this run at the second speed, it is decided (at Step 1) whether or not an upshift to the third speed is proper. This decision can be made by the electronic control unit, for example, on the basis of the throttle opening, the vehicle speed and a shift map, as stored in advance. When the answer of Step 1 is NO, that is, when the running state is not proper for the shift from the second speed to the third speed, this control routine is skipped out without any further control. When the answer of Step 1 is YES, the second clutch C2 and the first brake B1 are applied/released (at Step 2) in the following manner so as to change the gear stages from the second speed to the third speed.

First of all, the aforementioned second solenoid valve 31 of a low resistance is controlled to increase the duty ratio gradually so that its signal pressure acting upon the control port 30 gradually rises. Then, the regulated pressure level of the C2 oil pressure control valve 24 gradually rises so that the spool 25 moves downward of FIG. 1 to the position, as indicated at the lefthand half. As a result, the communication between the input port 40 and the output port 35 is established so that the output pressure acts upon the feedback port 34 via the oil passage 36. As the oil pressure in this feedback port 34 rises so high as to lift the spool 25, this spool 25 moves upward of FIG. 1 so that the output port 35 comes into communication with the drain port 41. Then, the oil pressure to act upon the feedback port 34 drops so that the spool 25 is pushed down again to provide the communication of the input port 40 with the output port 35. Thus, the spool 25 is repeatedly moved vertically so that the oil pressure according to the signal pressure acting upon the control port 30 is built up in the output port 35.

This oil pressure to be outputted from the C2 oil pressure control valve 24 is oscillated by the vertical movements of the spool 25, but the damper 39 is connected with the oil passage 36 leading to the second clutch C2. As a result, the oil pressure of the second clutch C2 is leveled by the damping action of the damper 39 so that the second clutch C2 is set either in a stably applied state or in the so-called "half-applied" state.

For the first brake B1, on the other hand, the control is made to lower the apply pressure gradually by turning OFF the third solenoid valve 50 and by lowering the duty ratio of the fourth solenoid valve 53. Specifically, simultaneously with the output of a shift signal, the duty ratio of the fourth solenoid valve 53 is set to a predetermined value smaller than 100%, and the solenoid valve 50 is turned OFF to stop outputting its signal pressure. Therefore, the signal pressure acts upon the control port 52 while releasing the lock port 49 of the brake pressure control valve 45 from any oil pressure, so that the pressure regulating level of the brake pressure control valve 45 is set to one corresponding to the signal pressure, as outputted by the fourth solenoid valve 53. As a result, the output pressure of the brake pressure control valve 45, that is, the oil pressure of the first brake B1 connected with the output port 55 is regulated to such a level as to balance the loads to act in the axial direction across the spool 46.

Incidentally, this pressure regulating action to be done by the brake pressure control valve 45 is similar to that in the aforementioned C2 oil pressure control valve 24, and the leveling of the oil pressure of the first brake B1 by the damper 65 is similar to that in the second clutch C2.

Thus, the shift is progressed while keeping the oil pressures of the second clutch C2 and the first brake B1 at a considerable level (i.e., a shelf pressure), and the input RPM (i.e, the turbine RPM) is lowered to the synchronous RPM of the third speed. After this, the duty ratio of the second solenoid valve 31 is increased to raise the apply pressure of the second clutch C2, and the duty ratio of the fourth solenoid valve 53 is further lowered to lower the apply pressure of the first brake B1. Finally, the first brake B1 is released, but the second clutch C2 is applied.

Figure 3:
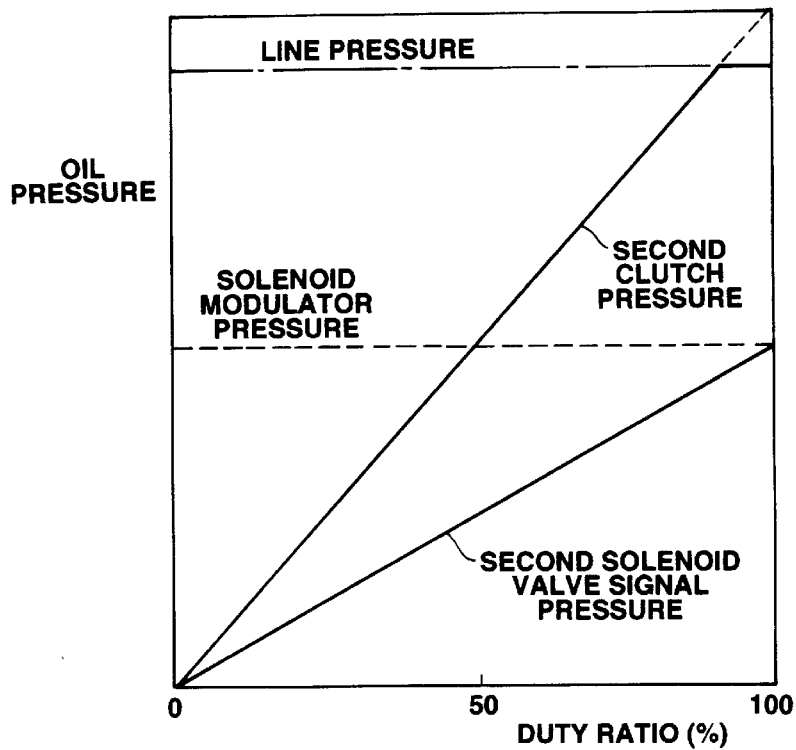
FIG. 3 is a characteristic diagram illustrating the duty ratio of a duty solenoid valve and the oil pressure of a second clutch in the embodiment of the present invention.

The speed change is executed, as described above, and the end of the upshift from the second speed to the third speed is decided (at Step 3) in the speed changing course. This decision can be made from the turbine RPM, the output shaft RPM and the gear ratio, as in the ordinary control of the automatic transmission. When the end of the upshift is decided, an instruction signal is outputted (at Step 4) to maximize the output pressure of the second solenoid valve 31. Specifically, the duty ratio of the second solenoid valve 31 is set to 100%. The characteristics of the signal pressure of the second solenoid valve 31 and the oil pressure of the second clutch C2 are illustrated in FIG. 3. In accordance with the increase in the duty ratio, the signal pressure of the second solenoid valve 31 and the oil pressure of the second clutch C2 gradually rise so that the duty ratio reaches substantially 100%. Then, the oil pressure of the second clutch C2 reaches the line pressure PL to complete the application.

In this state, the first solenoid valve 28 is turned ON (at Step 5) to apply its signal pressure to the lock port 27 of the C2 oil pressure control valve 24. As a result, the spool 25 of the C2 oil pressure control valve 24 is pushed down to and held at the position, as indicated by the lefthand half of FIG. 1, by the plunger 26 so that the line pressure PL is fed to keep the second clutch C2 in the completely applied state. Then, the second solenoid valve 31 is turned OFF (at Step 6).

In the controls described above, the second solenoid valve 31 of a low resistance to be duty-controlled is activated only in the course of speed change and is turned OFF at the end of the speed change. As a result, the second solenoid valve 31 controls the oil pressure of the second clutch C2 in quick response because of its low resistance, and is inactivated after the end of the speed change so that no damage is caused by the heat even with the low resistance. On the other hand, the first solenoid valve 28 having the high resistance is held in the ON state while the second clutch C2 is being kept in the applied state, but the high resistance suppresses the electric current to cause no problem such as the overheat.

Figure 4:
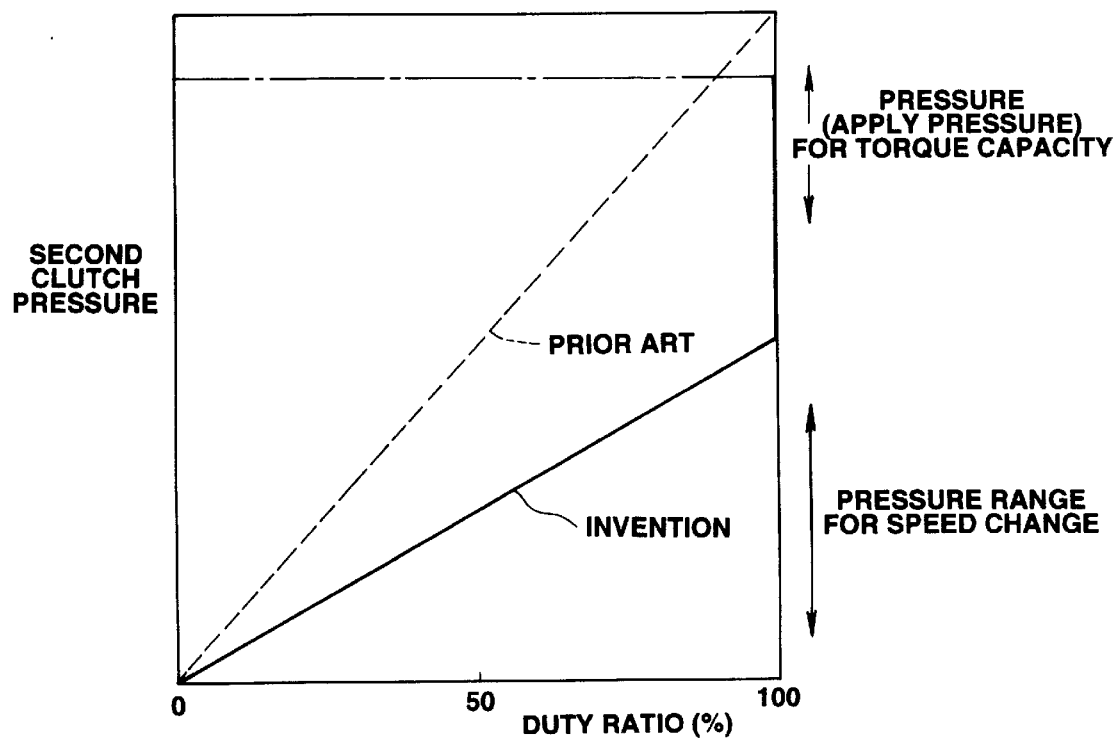
FIG. 4 is a diagram illustrating the hydraulic characteristics of the second clutch according to the present invention and the hydraulic characteristics of the second clutch of a system of the prior art.

According to the controls described above, moreover, the oil pressure of the second clutch C2 at the transient time of speed change is controlled by the second solenoid valve 31, and the applied state of the second clutch C2 is kept by the first solenoid valve 28, so that the oil pressure of the second clutch C2 can be varied according to the characteristics illustrated in FIG. 4. As plotted by a solid line of FIG. 4, the pressure range necessary for the speed change is controlled by varying the duty ratio of the second solenoid valve 31, and the pressure necessary for holding the more applied state is controlled by the first solenoid valve 28. Thus, the varying gradient of the oil pressure of the second clutch C2 is so gentle as to reduce the pressure fluctuation which might otherwise be caused by a small disturbance of the control such as the dispersion in the signal pressure of the second solenoid valve 31. This makes it possible to prevent the shock which might otherwise be caused by the fluctuation of the torque capacity of the frictional engagement elements participating the speed change.

If the entire pressure range of the second clutch C2 is controlled as in the prior art by a single solenoid valve, on the contrary, the pressure is controlled from the released state to the maximum pressure for the complete application, as plotted by a broken line in FIG. 4. Then, the varying gradient of the oil pressure of the second clutch C2 becomes so steep that the oil pressure fluctuation, as would be caused by the dispersion in the control, may possibly be serious to deteriorate the shift shock.

Incidentally, the foregoing embodiment is constructed such that the C2 oil pressure control valve 24 is controlled to a state similar to that where the second solenoid valve 31 is ON, by equipping the C2 oil pressure control valve 24 with the locking plunger 26 and by applying the signal pressure of the first solenoid valve 28 to be turned ON/OFF to that plunger 26. However, the construction of the present invention may be modified into one shown in FIG. 5, because it is sufficient for the present invention that the ON control state for the first solenoid valve 28 to be turned ON/OFF and the ON control state of the second solenoid valve 31 to be duty-controlled are identical. Specifically, the C2 oil pressure control valve 24, as shown in FIG. 5, is equipped with only the aforementioned spool 25, and the first solenoid valve 28 and the second solenoid valve 31 are connected in parallel with the control port 30 which is formed at the side of the diametrically larger land of the spool 25.

Figure 5:
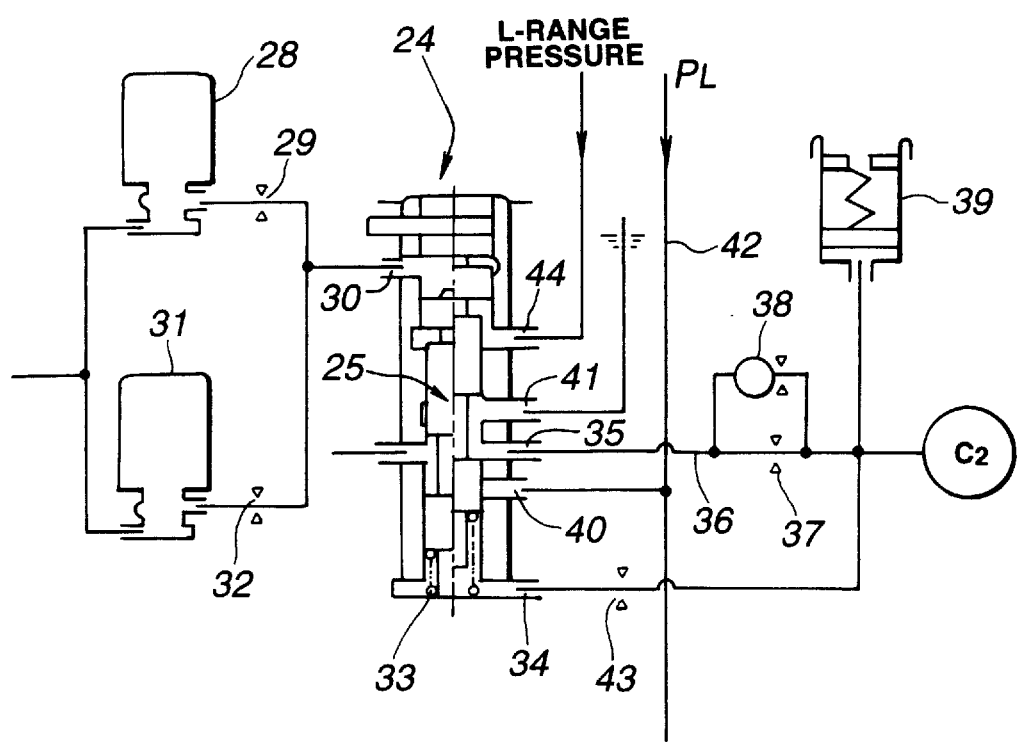
FIG. 5 is a hydraulic circuit diagram showing a portion of another example of the present invention.

In this construction shown in FIG. 5, in the course of applying the second clutch C2, the second solenoid valve 31 is duty-controlled to control the oil pressure of the second clutch C2. When the second clutch C2 is to be held in the applied state, the first solenoid valve 28 is turned ON. According to this construction, too, the oil pressure control of quick response can be achieved as in the foregoing embodiment to prevent the damage of the solenoid valve to be duty-controlled.

Moreover, the foregoing embodiments have been described on the case where the oil pressure of the second clutch C2 is controlled. However, since the first brake B1 is equipped with the ON/OFF controlled third solenoid valve 50 and the duty-controlled fourth solenoid valve 53 having the coil of low resistance, the shifting transient oil pressure can also be controlled in a quick response by the fourth solenoid valve 53 even at the speed change of applying the first brake B1 as in the control of the second clutch C2, and the applied state can be held by the third solenoid valve 50. For this first brake B1, as in the second clutch C2, moreover, the third solenoid valve 50 and the fourth solenoid valve 53 can be connected in parallel with a common control port.

Still moreover, the present invention can also be applied to a control system for an automatic transmission which is equipped with a gear train other than the aforementioned one, and accordingly to an oil pressure control for the frictional engagement elements other than those participating the speed change between the second speed and the third speed. In short, the present invention can be applied to a control of frictional engagement elements in which the oil pressure is directly controlled by a solenoid valve. The present invention can be further applied to a control system for the frictional engagement elements which are kept in the released state by outputting a signal pressure.

When the ON/OFF solenoid valve of a high resistance is used only for keeping the frictional engagement elements in the applied state, the solenoid valve, as used for another control, can be commonly used to lower the cost. For example, the solenoid valve, as used for controlling the lockup clutch and the orifice, may be commonly used as one for locking the aforementioned brake pressure control valve 45.

Here will be synthetically described the advantages to be obtained by the present invention. According to the oil pressure control system of the present invention, the ON/OFF controlled solenoid valve and the solenoid valve to be electrically controlled in a continuous manner by the duty control are so connected with the regulator valve for regulating the pressures of the frictional engagement elements that their individual signal pressures may act in the same direction. The oil pressures of the frictional engagement elements are regulated by the duty solenoid valve, and the control for keeping the frictional engagement elements in the applied/released states is made by the ON/OFF solenoid valve. Moreover, the ON/OFF solenoid valve is given a higher electric resistance than that of the duty solenoid valve so that the pressures of the frictional engagement elements can be regulated accurately and responsively to provide an automatic transmission having little shift shock. Since the electric current is not fed for a long time to the solenoid valve having a low resistance, moreover, the heating and the resultant damage can be prevented in advance, and neither any device nor system for limiting the electric current need be provided to lower the cost.

What is claimed is:

1. An oil pressure control system for an automatic transmission for controlling the oil pressure of a frictional engagement element by a regulator valve for outputting an oil pressure according to a signal pressure inputted, comprising:

a first solenoid valve adapted to be ON/OFF controlled for outputting/stopping said signal pressure; and a second solenoid valve having a lower electric resistance than that of said first solenoid valve for outputting a signal pressure varying with an electric signal inputted and for applying said signal pressure in the same direction as that of the signal pressure, as outputted from said first solenoid valve, to said regulator valve.

2. An oil pressure control system according to claim 1, wherein said regulator valve includes: a spool for opening/closing an output port to output said oil pressure; a feedback port for applying the oil pressure, as outputted from said output port, to one end portion of said spool; a control port for applying the signal pressure, as outputted from said second solenoid valve, to the other end portion of said spool; a plunger arranged at the side of said control port with respect to said spool and having a larger pressure receiving area than that of said spool; and a lock port for applying the signal pressure, as outputted from said first solenoid valve, so that said plunger may push said spool.

3. An oil pressure control system according to claim 1, wherein said regulator valve includes: a spool for opening/closing an output port to output said oil pressure; a feedback port for applying the oil pressure, as outputted from said output port, to one end portion of said spool; a control port for applying the signal pressure, as outputted from said first solenoid valve, and the signal pressure, as outputted from said second solenoid valve, to the other end portion of said spool.

4. An oil pressure control system according to claim 1, further comprising:

means for duty-controlling said second solenoid valve at a predetermined speed change of said automatic transmission, for turning ON said first solenoid valve simultaneously with the control for said second solenoid valve to output the maximum pressure, and for subsequently turning OFF said second solenoid valve.

* * * * *